(12) United States Patent
Katayama

(10) Patent No.: US 10,959,016 B2
(45) Date of Patent: Mar. 23, 2021

(54) SPEAKER POSITION DETECTION SYSTEM, SPEAKER POSITION DETECTION DEVICE, AND SPEAKER POSITION DETECTION METHOD

(71) Applicant: Yamaha Corporation, Hamamatsu (JP)

(72) Inventor: Masaki Katayama, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 15/951,433

(22) Filed: Apr. 12, 2018

(65) Prior Publication Data

US 2018/0302711 A1 Oct. 18, 2018

(30) Foreign Application Priority Data

Apr. 13, 2017 (JP) .............................. JP2017-079730

(51) Int. Cl.
| | | |
|---|---|---|
| H04R 1/34 | (2006.01) | |
| H04R 1/32 | (2006.01) | |
| G06F 3/16 | (2006.01) | |
| H04R 5/027 | (2006.01) | |
| H04R 5/02 | (2006.01) | |
| H04S 7/00 | (2006.01) | |

(52) U.S. Cl.
CPC .............. *H04R 1/323* (2013.01); *G06F 3/16* (2013.01); *H04R 5/02* (2013.01); *H04R 5/027* (2013.01); *H04S 7/301* (2013.01); *H04R 2420/07* (2013.01)

(58) Field of Classification Search
CPC ............ H04R 1/345; H04R 5/02; H04S 7/301
USPC ........................................................ 381/300
See application file for complete search history.

(56) References Cited

U.S. PATENT DOCUMENTS

| 5,912,980 A | 6/1999 | Hunke |
| 6,741,273 B1 | 5/2004 | Waters et al. |
| 2003/0147543 A1* | 8/2003 | Katayama ................ H04R 5/02 |
| | | 381/309 |

(Continued)

FOREIGN PATENT DOCUMENTS

| EP | 1 718 114 A1 | 11/2006 |
| EP | 3 416 411 A1 | 12/2018 |

(Continued)

OTHER PUBLICATIONS

Panigrahi et al., Effect of Normalization Techniques on Univariate Time Series Forecasting using Evolutionary Higher Order Neural Network, Dec. 2013, IJEAT (Year: 2013).*
Blank T., et al., "An Internet Protocol (IP) Sound System", Audio Engineering Society Convention 117, Oct. 28-31, 2004, pp. 1-17, San Francisco, CA, US, XP040506960, (17 pages).

(Continued)

*Primary Examiner* — Ahamd F. Matar
*Assistant Examiner* — Jirapon Intavong
(74) *Attorney, Agent, or Firm* — Crowell & Moring LLP

(57) ABSTRACT

The burden on the user of adjusting a sound outputted from a speaker is to be reduced. A speaker position detection system includes a first speaker unit having at least one speaker, and a second speaker unit having a speaker and a plurality of microphones. Alternatively, a speaker position detection system includes a first speaker unit having a plurality of speakers, and a second speaker unit having a speaker and a microphone. The speaker position detection system calculates position information representing a position of one of the first speaker unit and the second speaker unit, based on a test sound outputted from one of the speakers and detected by one of the microphones.

17 Claims, 12 Drawing Sheets

(56) References Cited

U.S. PATENT DOCUMENTS

| | | | |
|---|---|---|---|
| 2007/0133813 A1 | 6/2007 | Morishima | |
| 2009/0081948 A1* | 3/2009 | Banks | H04R 5/02 |
| | | | 455/3.05 |
| 2011/0019844 A1* | 1/2011 | Chang | H04R 1/345 |
| | | | 381/160 |
| 2012/0113224 A1 | 5/2012 | Nguyen et al. | |
| 2012/0294456 A1* | 11/2012 | Jiang | H04R 3/005 |
| | | | 381/92 |
| 2013/0156198 A1 | 6/2013 | Kim et al. | |
| 2014/0369519 A1 | 12/2014 | Leschka et al. | |
| 2016/0309279 A1 | 10/2016 | Kim et al. | |
| 2017/0201847 A1 | 7/2017 | Fujita | |
| 2017/0280265 A1 | 9/2017 | Po | |

FOREIGN PATENT DOCUMENTS

| | | |
|---|---|---|
| JP | 2001-54200 A | 2/2001 |
| JP | 2005-236502 A | 9/2005 |
| JP | 2015-507864 A | 3/2015 |
| JP | 2015-228625 A | 12/2015 |
| JP | 2016-119635 A | 6/2016 |
| WO | WO 2008/126161 A1 | 10/2008 |

OTHER PUBLICATIONS

Extended European Search Report issued in counterpart European Application No. 18166996.1 dated Aug. 27, 2018 (eight (8) pages).

Extended European Search Report issued in counterpart European Application No. 18162249.9 dated Aug. 20, 2018 (seven (7) pages).

Non-Final Office Action issued in U.S. Appl. No. 15/923,741 dated Aug. 31, 2018.

Japanese-language Office Action issued in counterpart Japanese Application No. 2017-053248 dated Feb. 12, 2019 with English translation (7) seven pages).

English translation of Chinese Office Action issued in Chinese Application No. 201810331054.4 dated Feb. 25, 2020 with (12 pages).

European Office Action issued in counterpart European Application No. 18 166 996.1 dated Dec. 2, 2019 (six pages).

European Summons to Attend Oral Proceedings Pursuant to Rule 115(1) EPC issued in European No. 18 166 996.1 dated Jul. 14, 2020 (eight (8) pages).

Japanese-language Office Action issued in Japanese Application No. 2017-079730 dated Oct. 27, 2020 with English translation (10 pages).

* cited by examiner

SPEAKER POSITION DETECTION SYSTEM, SPEAKER POSITION DETECTION DEVICE, AND SPEAKER POSITION DETECTION METHOD

CROSS-REFERENCE TO RELATED APPLICATION

The present application claims priority from Japanese Application JP 2017-079730 filed on Apr. 13, 2017, the content of which is hereby incorporated by reference into this application.

BACKGROUND OF THE INVENTION

1. Field of the Invention

The present invention relates to a speaker position detection system, a speaker position detection device, and a speaker position detection method.

2. Description of the Related Art

A system in which multiple speakers are arranged such as a 5.1-channel home theater system is broadly used. For example, a microphone is arranged at the position of a listener and thus acquires a sound from a speaker, and a parameter such as the channel of an audio signal outputted to the speaker is decided according to the acquired sound (WO2008/126161).

The invention disclosed in WO2008/126161 involves the need to place the microphone at the position of the listener and also requires the listener to be careful not to make a sound which results in noise during adjustment. For example, when a portable speaker is used, the user tends to need to carry out setting work an increasing number of times. Therefore, the burden of adjustment on the user is not negligible.

SUMMARY OF THE INVENTION

In view of the foregoing problems, an object of the invention is to provide a speaker position detection system, a speaker position detection device, a speaker position detection method, and a program that enable a reduction in the burden on the user of adjusting a sound outputted from the speaker.

To solve the foregoing problems, a speaker position detection system according to the invention includes: a first speaker unit having at least one speaker; a second speaker unit having a speaker and a plurality of microphones; and a detection unit which calculates relative position information between the first speaker unit and the second speaker unit. The detection unit causes the speaker included in the first speaker unit to output a test sound, and calculates the position information representing a position of one of the first speaker unit and the second speaker unit, based on the test sound detected by each of the plurality of microphones.

A speaker position detection method according to the invention includes: causing a speaker included in a first speaker unit having at least one speaker to output a test sound; and calculating position information representing a position of one of the first speaker unit and a second speaker unit, based on the test sound detected by each of a plurality of microphones included in the second speaker unit having a speaker.

A speaker position detection device according to the invention includes: a unit which causes a speaker included in a first speaker unit having at least one speaker to output a test sound; and a unit which calculates position information representing a position of one of the first speaker unit and a second speaker unit, based on the test sound detected by each of a plurality of microphones included in the second speaker unit having a speaker.

Another speaker position detection system according to the invention includes: a first speaker unit having a plurality of speakers; a second speaker unit having a speaker and a microphone; and a detection unit which calculates relative position information between the first speaker unit and the second speaker unit. The detection unit causes at least two of the plurality of speakers included in the first speaker unit to output a test sound, and calculates the position information representing a position of one of the first speaker unit and the second speaker unit, based on the test sound outputted from each of the at least two speakers and detected by each of the microphones.

Another speaker position detection method according to the invention includes: causing at least two of a plurality of speakers included in a first speaker unit to output a test sound; and calculating position information representing a position of one of the first speaker unit and a second speaker unit, based on the test sound detected from each of the at least two speakers by a microphone included in the second speaker unit.

Another speaker position detection device according to the invention includes: a unit which causes at least two of a plurality of speakers included in a first speaker unit to output a test sound; and a unit which calculates position information representing a position of one of the first speaker unit and a second speaker unit, based on the test sound detected from each of the at least two speakers by a microphone included in the second speaker unit.

The invention enables a reduction in the burden on the user of adjusting a sound outputted from the speaker.

DETAILED DESCRIPTION OF THE INVENTION

Hereinafter, examples of embodiment of the invention will be described with reference to the drawings.

First Embodiment

Figure 1:
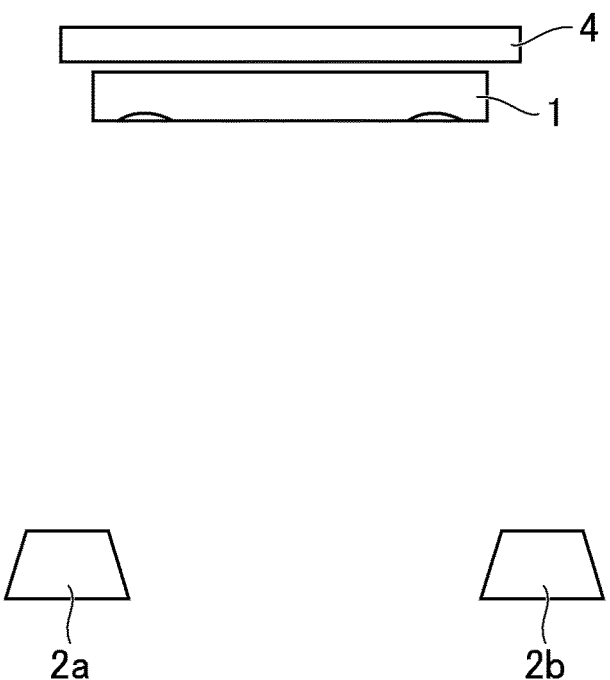
FIG. 1 is a plan view for explaining an example of a surround system according to a first embodiment.

FIG. 1 is a plan view showing an example of a surround system according to a first embodiment. The surround system includes a front unit 1 and a plurality of speaker units 2. The front unit 1 is arranged in front of a television 4 and outputs at least two channels of sound. The speaker units 2 output a sound in collaboration with the front unit 1. The surround system, for example, outputs a multi-channel sound inputted from the television 4 or the like and thus allows the listener to enjoy music with a feeling of a live performance. In FIG. 1, two speaker units 2a, 2b are arranged as a plurality of speaker units 2. However, more speaker units 2 may be arranged, or a single speaker unit 2 may be arranged.

Figure 2:
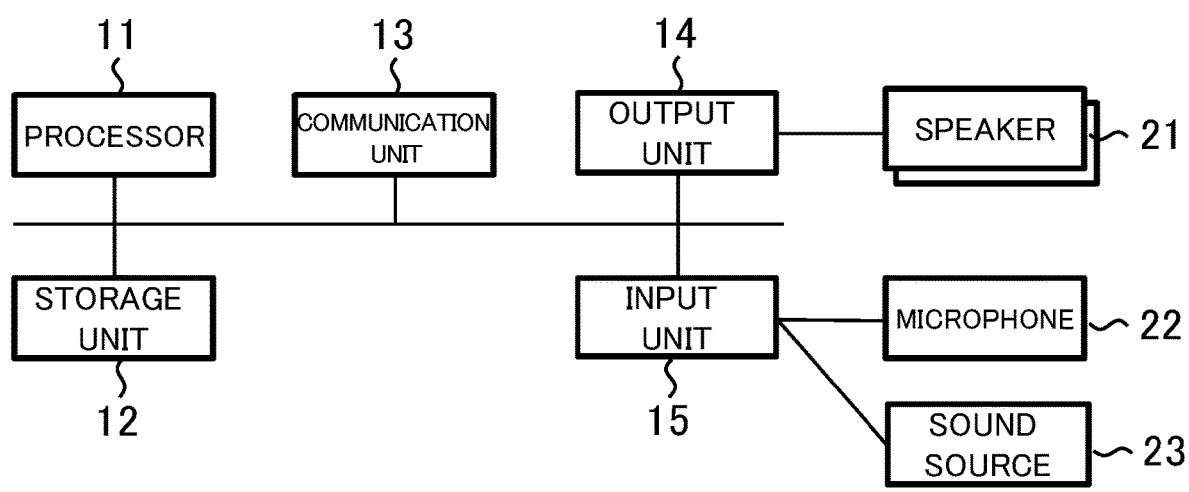
FIG. 2 is a block diagram schematically showing the hardware configuration of a front unit.
Figure 3:
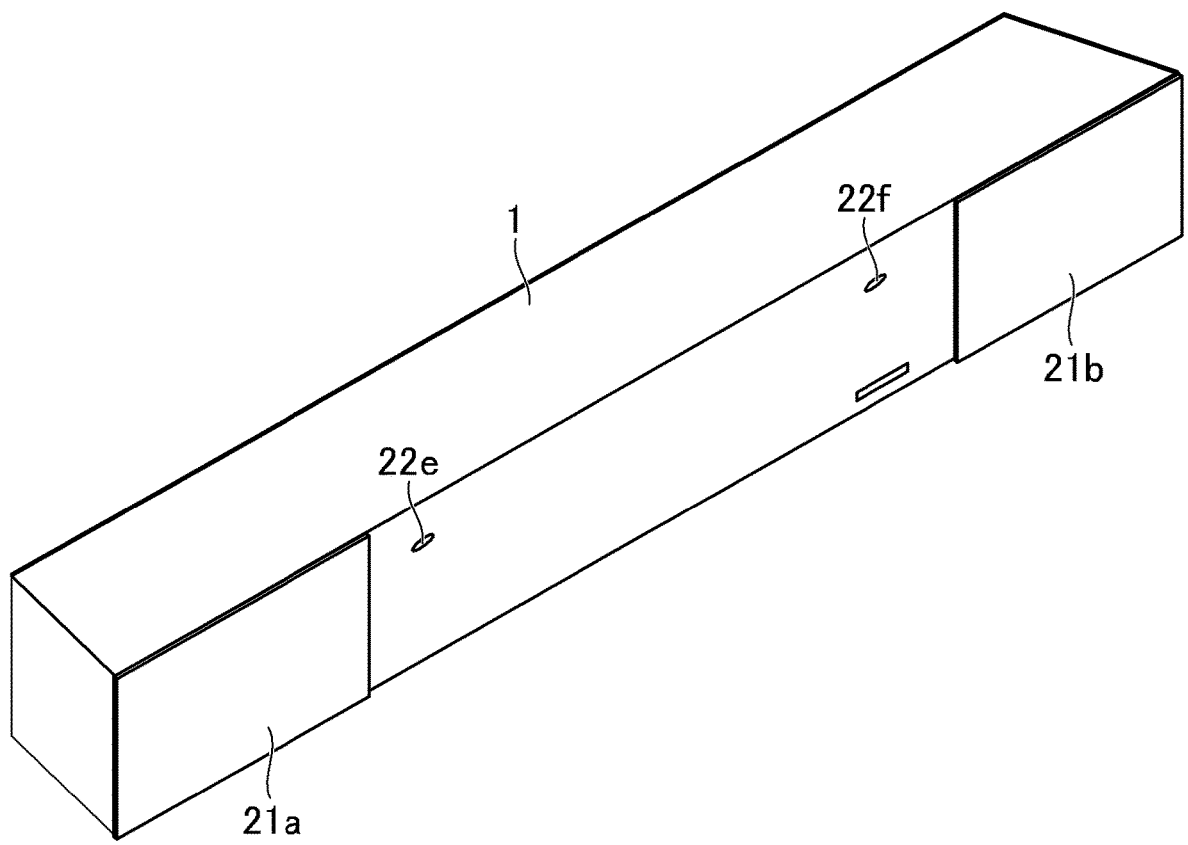
FIG. 3 is a perspective view showing the appearance of the front unit.

The front unit 1 is an apparatus generally called a sound bar. FIG. 2 is a block diagram schematically showing the hardware configuration of the front unit 1. FIG. 3 is a perspective view showing the appearance of the front unit 1. The front unit 1 includes a processor 11, a storage unit 12, a communication unit 13, an output unit 14, an input unit 15, speakers 21, and a microphone 22. The input unit 15 is connected to the microphone 22 and to a sound source 23 such as the television 4 and other audio apparatuses. In the example of FIG. 3, the speakers 21 includes a left speaker 21a and a right speaker 21b spaced apart from each other. The microphone 22 includes microphones 22e, 22f.

The front unit 1 has a horizontally long shape and is generally arranged parallel to a side of the screen of the television 4, the side extends laterally. The front unit 1 has the left speaker 21a and the right speaker 21b arranged, laterally spaced apart from each other. The microphones 22e, 22f are spaced apart from each other and laid laterally side by side. Alternatively, multiple array speakers laid laterally side by side may be arranged instead of the left speaker 21a and the right speaker 21b. The front unit 1 may also be implemented by a plurality of apparatuses connected to each other. For example, the front unit 1 may be made up of an AV amplifier, and an R-channel speaker and an L-channel speaker which are connected to the AV amplifier.

The processor 11 operates according to a program stored in the storage unit 12 and thus controls the communication unit 13, the output unit 14, and the input unit 15. The program may be stored in a computer-readable storage medium such as a flash memory, or may be provided via a network.

The storage unit 12 is made up of a memory device such as a DRAM and flash memory. The storage unit 12 stores the program. The storage unit 12 also stores information and results of computations inputted from the processor 11 and the communication unit 13 or the like.

The communication unit 13 is made up of an integrated circuit that forms a wired LAN, wireless LAN or Bluetooth (trademark) transceiver, and a connector, an antenna and the like. The communication unit 13 communicates with another device via a network. The communication unit 13, under the control of the processor 11, inputs information received from another device to the processor 11 and the storage unit 12 and transmits information to another device.

The output unit 14 includes, for example, a DA converter and a headphone terminal and is connected to the speaker 21 or the like. The input unit 15 includes, for example, an AD converter, a line input terminal, a digital audio input interface, and an HDMI (trademark) input interface.

Figure 4:
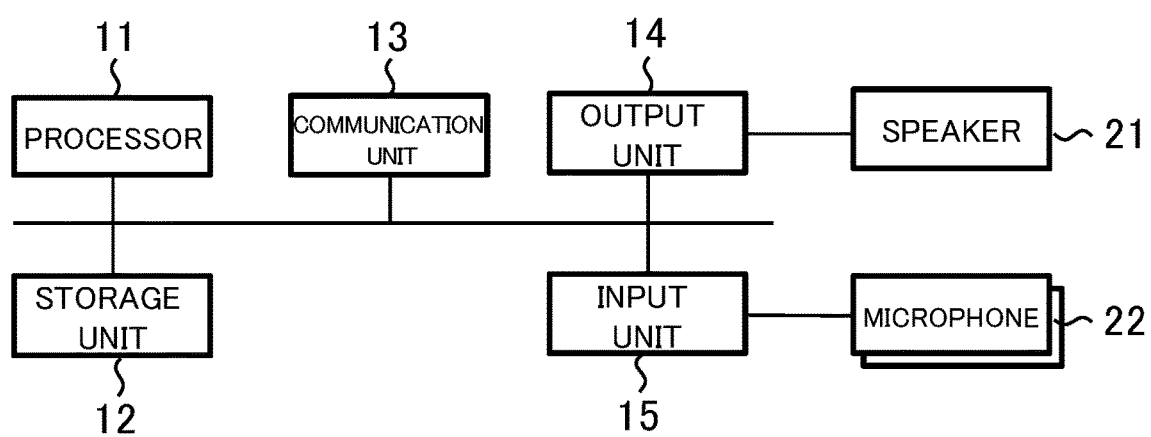
FIG. 4 is a block diagram schematically showing the hardware configuration of a speaker unit.
Figure 5:
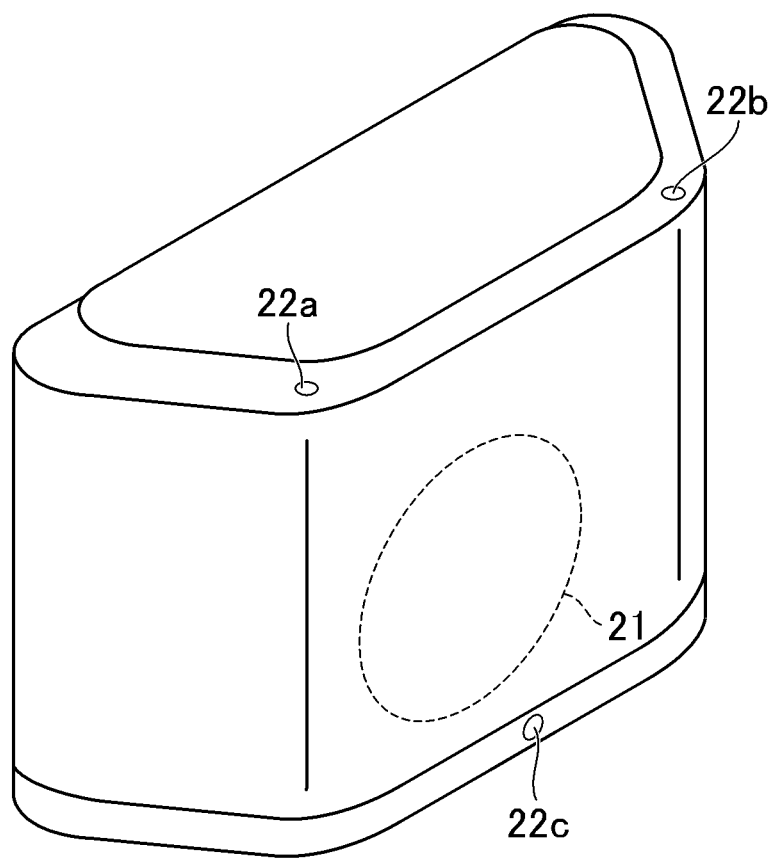
FIG. 5 is a block diagram showing the appearance of the speaker unit.

FIG. 4 is a block diagram schematically showing the hardware configuration of the speaker unit 2. FIG. 5 shows the appearance of the speaker unit 2. FIG. 4 shows an example of the speaker unit 2 generally called a wireless speaker. The speaker unit 2 includes a processor 11, a storage unit 12, a communication unit 13, an output unit 14, an input unit 15, a speaker 21, and a microphone 22. Details of the processor 11, the storage unit 12, and the communication unit 13 are similar to those included in the front unit 1 and therefore will not be described further. The output unit 14 includes, for example, a DA converter and is connected to the speaker 21. The input unit 15 includes an AD converter and is connected to the microphone 22. In the example of FIG. 5, the microphone 22 includes a microphone 22a on the left-hand side, a microphone 22b on the right-hand side, and a microphone 22c on at the bottom.

The speaker unit 2 receives audio data wirelessly from an apparatus such as the front unit 1 and outputs a sound represented by the audio data from the built-in speaker 21. The speaker unit 2 receives the audio data via the communication unit 13. The speaker unit 2 maybe connected to the front unit 1 and an amplifier via a cable.

Figure 6:
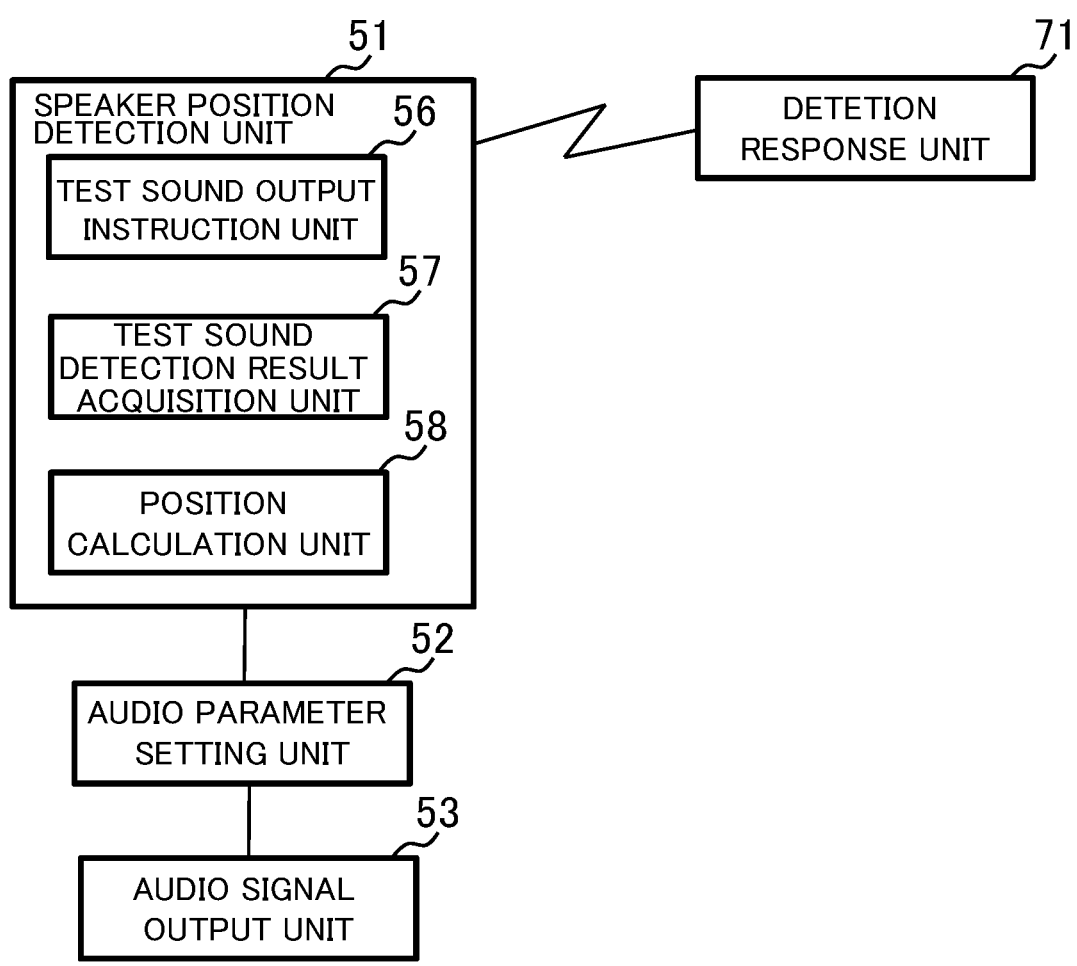
FIG. 6 is a block diagram showing the functional configuration of the surround system.

FIG. 6 is a block diagram showing the functional configuration of the surround system. Functionally, the surround system includes a speaker position detection unit 51, an audio parameter setting unit 52, an audio signal output unit 53, and a detection response unit 71. The speaker position detection unit 51 functionally includes a test sound output instruction unit 56, a test sound detection result acquisition unit 57, and a position calculation unit 58. The speaker position detection unit 51, the audio parameter setting unit 52, and the audio signal output unit 53 are implemented by the processor 11 included in the front unit 1 executing a program stored in the storage unit 12 and thus controlling the communication unit 13, the output unit 14, the input unit 15 and the like. The detection response unit 71 is implemented by the processor 11 included in the speaker unit 2 executing a program stored in the storage unit 12 and thus controlling the communication unit 13, the input unit 15 and the like.

The speaker position detection unit 51, the audio parameter setting unit 52 and the like may be implemented by another apparatus having the processor 11, the storage unit 12, and the communication unit 13, such as a smartphone.

The speaker position detection unit 51 calculates relative position information between the front unit 1 and the speaker unit 2. The test sound output instruction unit 56 included in the speaker position detection unit 51 causes the speaker 21 included in one of the front unit 1 and the speaker unit 2 to output a test sound. The test sound detection result acquisition unit 57 included in the speaker position detection unit 51 acquires information of a test sound detected by the other of the front unit 1 and the speaker unit 2. The position calculation unit 58 included in the speaker position detection unit 51 calculates relative position information between the front unit 1 and the speaker unit 2, based on the acquired information of the test sound. The position information may express the relative position between the front unit 1 and the speaker unit 2 in the form of coordinates or in the form of direction and distance, or may express only the direction of the speaker unit 2 with respect to the front unit 1 as a reference point.

The audio parameter setting unit 52 decides a parameter of an audio signal outputted to the speaker unit 2, based on the calculated position information. More specifically, the audio parameter setting unit 52 decides the channel of an audio signal allocated to the speaker unit 2, based on the position and direction of the speaker unit 2 expressed by the position information. The audio parameter setting unit 52 may also decide a parameter related to correction of an audio signal, such as correction of the amount of delay in the output of a sound and frequency characteristics thereof.

The audio signal output unit 53 outputs an audio signal to the speaker 21 included in the front unit 1 and to the speaker unit 2, based on the parameter thus decided and an audio signal supplied from the sound source 23. The audio signal may be an electrical signal or data. Based on the audio signal thus outputted, a sound is outputted from the speaker 21 included in the front unit 1 and in the speaker unit 2.

Figure 7:
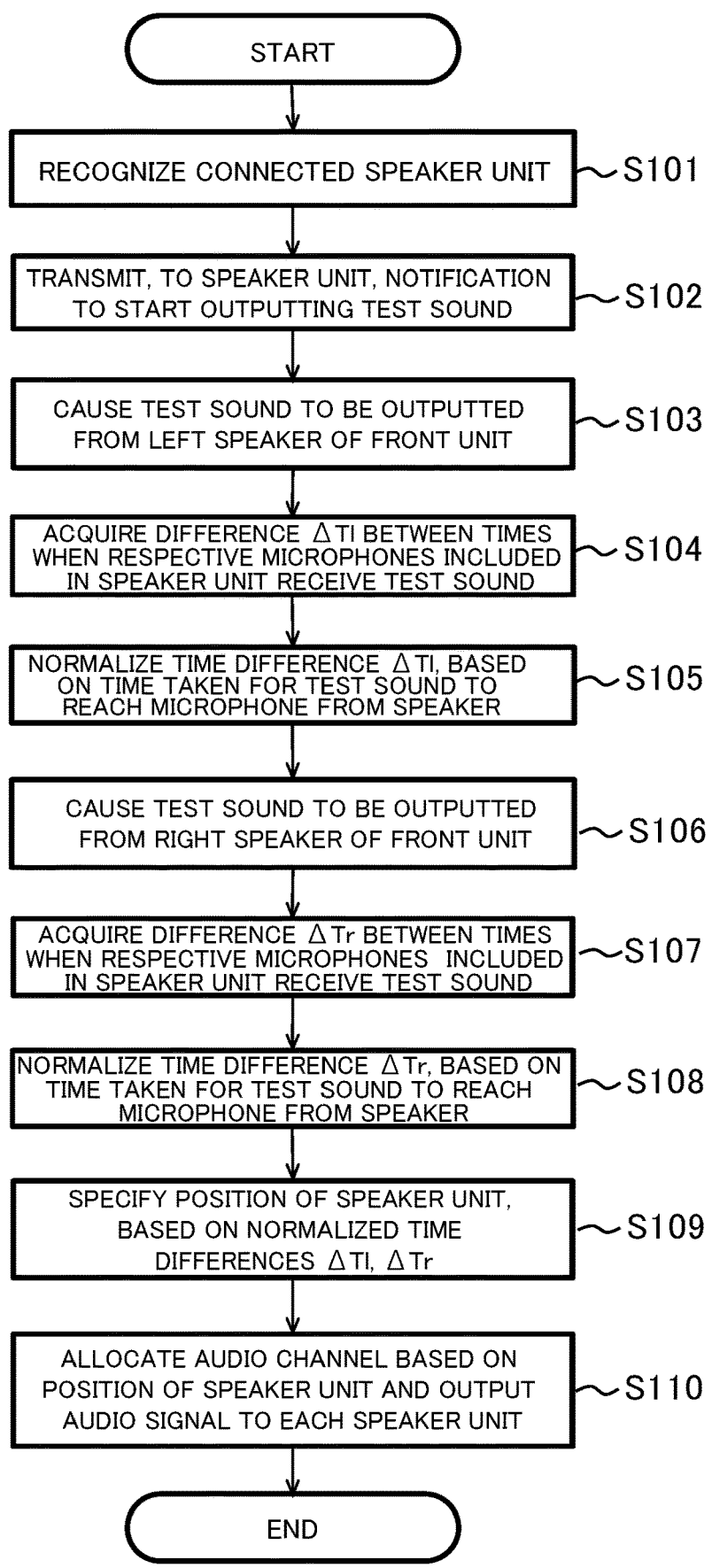
FIG. 7 is a flowchart showing an example of the processing by the front unit according to the first embodiment.
Figure 8:
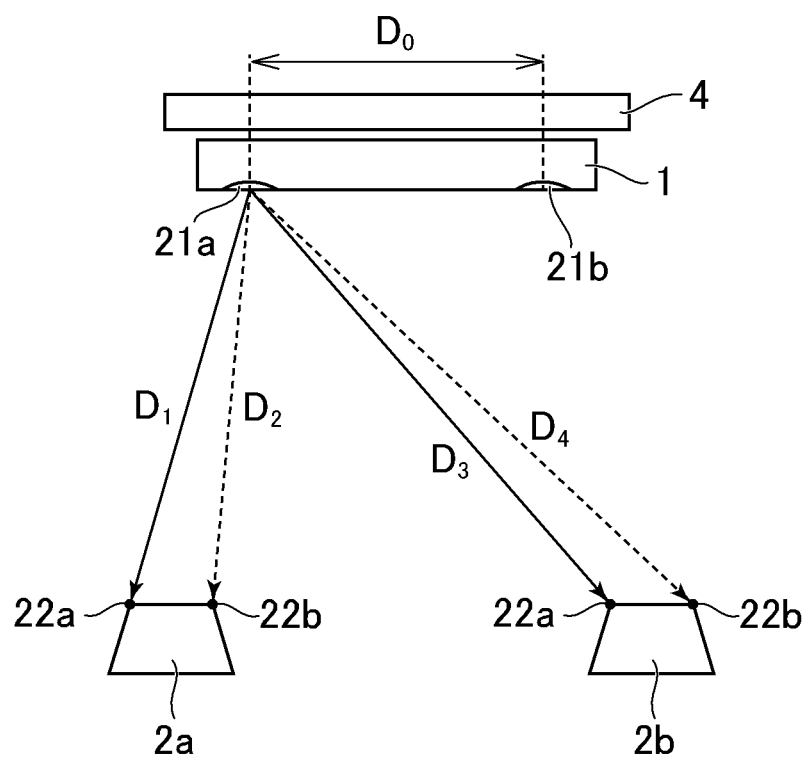
FIG. 8 explains an example of the relation between the speaker unit and the front unit.
Figure 9:
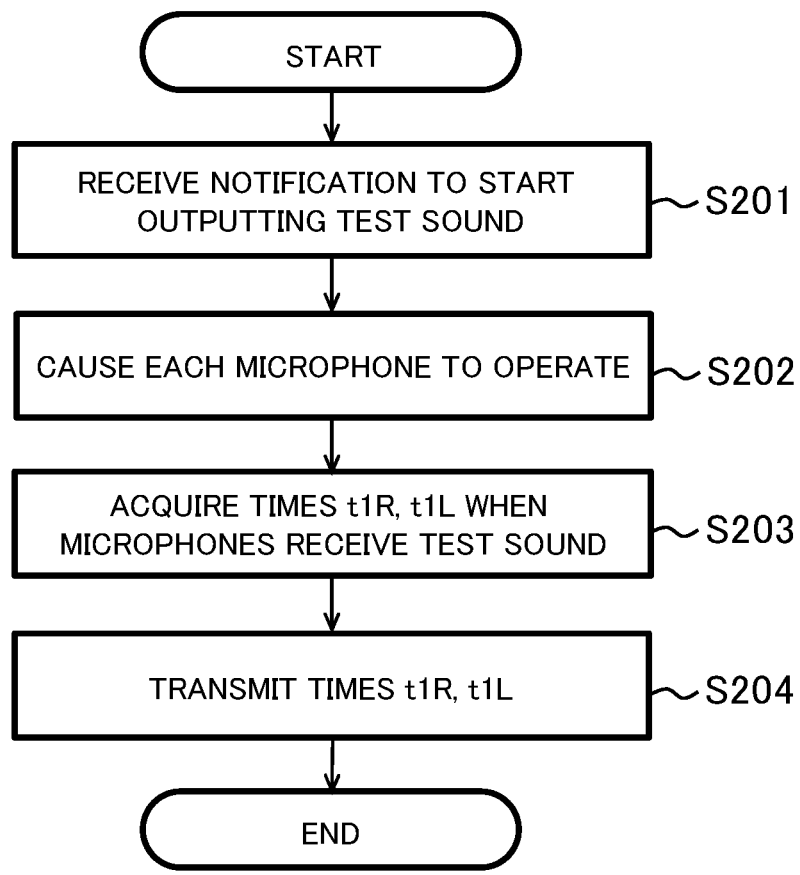
FIG. 9 is a flowchart showing an example of the processing by the speaker unit.

Now, processing to detect the position of the speaker unit 2 and decide a parameter of an audio signal will be described. FIG. 7 is a flowchart showing an example of the processing by the front unit 1 according to the first embodiment. FIG. 8 explains an example of the relation between the speaker unit 2 and the front unit 1. FIG. 9 is a flowchart showing an example of the processing by the speaker unit 2.

FIGS. 7 to 9 show an example in the case where a test sound is outputted from the left speaker 21a and the right speaker 21b of the front unit 1 and where a test sound detected by a plurality of microphones 22a, 22b included in each of the speaker units 2 is used. A part or the entirety of the processing shown in FIG. 7 may be executed by another apparatus such as a smartphone. The processing of steps S102, S104, S105, S107, and S108 is carried out for each speaker unit 2.

First, the speaker position detection unit 51 recognizes the speaker unit 2 connected via the communication unit 13 (step S101). The speaker position detection unit 51 may recognize the speaker unit 2 connected via a cable. It is assumed that the time of the front unit 1 and the time of the speaker unit 2 are synchronized by a known technique.

Next, the test sound output instruction unit 56 transmits to the speaker unit 2 a notification to start outputting a test sound (step S102). Meanwhile, the detection response unit 71 of each speaker unit 2 receives the notification to start outputting a test sound, transmitted from the front unit 1 (step S201). The detection response unit 71 causes each microphone 22 arranged in the speaker unit 2 to operate (step S202).

After the notification to start outputting a test sound is transmitted and the microphones 22 start operating, the test sound output instruction unit 56 causes a test sound to be outputted from the left speaker 21a of the front unit 1 (step S103). The test sound may be a pulse-like sound, a sound that changes in volume in a sweep-like manner, or a section with changing volume or frequency of music that has been played for some time.

Then, the detection response unit 71 of the speaker unit 2 detects the test sound inputted to a plurality of microphones and transmits information about the test sound. More specifically, the detection response unit 71 acquires times t1R, t1L when the microphones 22a, 22b detect the test sound (step S203). The detection response unit 71 then transmits the acquired times t1R, t1L (step S204). The processing of steps S203 and S204 is carried out every time the microphones 22 receive a test sound. The detection response unit 71 may transmit data of the test sound inputted to the microphones 22a, 22b or the difference between the times t1R and t1L, instead of the times t1R, t1L.

The test sound detection result acquisition unit 57 of the speaker position detection unit 51 receives the information about the test sound from the detection response unit 71 and thus acquires the time difference $\Delta T1$ between the times t1L, t1R when the microphones 22a, 22b included in the speaker unit 2 receive the test sound (step S104). To acquire the time difference $\Delta T1$, the test sound detection result acquisition unit 57 may calculate the difference between the times t1L and t1R or may receive the difference between the times t1R and t1L from the speaker unit 2. The test sound detection result acquisition unit 57 may also receive data of the test sound inputted to the microphones 22a, 22b and analyze the data, thus finding the times t1R, t1L.

Figure 10:
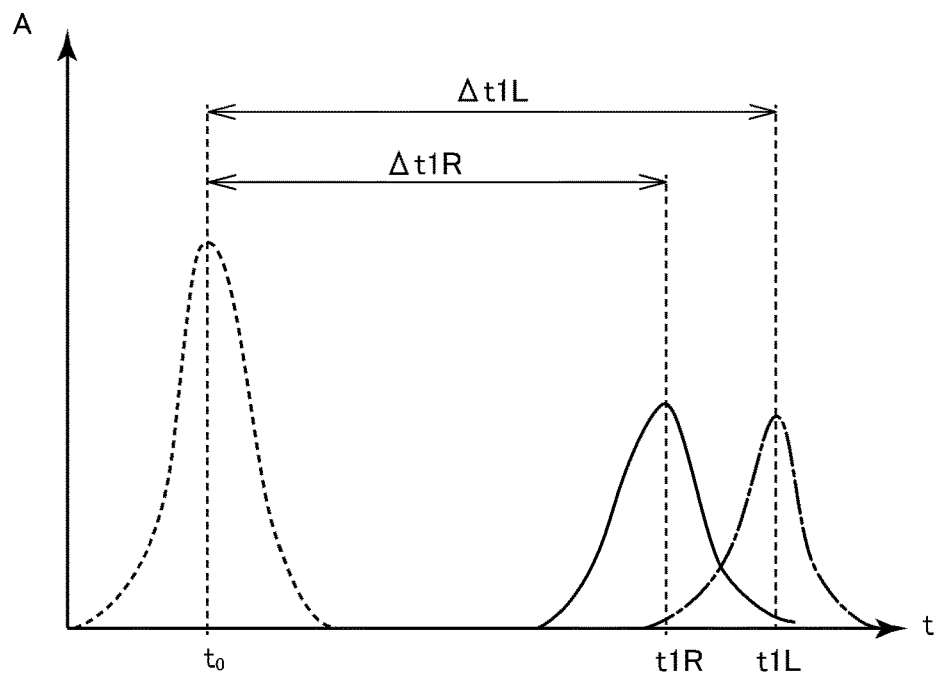
FIG. 10 explains the time of outputting a test sound from a speaker and the time of detecting the test sound by a microphone.

FIG. 10 explains the time t0 of outputting a test sound from the speaker 21 and the times t1R, t1L of detecting the test sound by the microphones 22. FIG. 10 shows an example in the case where the speaker 21 of the front unit 1 outputs a test sound at the time t0, the microphone 22a detects the test sound at the time t1L, and the microphone 22b detects the test sound at the time t1R. The taken time $\Delta t1L$ for the test sound to reach the microphone 22a from the speaker 21 is found by an equation of (t1L−t0). The taken time $\Delta t1R$ for the test sound to reach the microphone 22b from the speaker 21 is found by an equation of (t1R−t0). The distances between the speaker 21 outputting the test sound and the microphones 22a, 22b detecting the test sound are found by multiplying the times taken $\Delta t1L$, $\Delta t1R$ by the speed of sound.

The test sound detection result acquisition unit 57 normalizes the time difference $\Delta T1$, based on the times taken for the test sound to reach the microphones 22 from the speaker 21 (step S105). More specifically, the test sound detection result acquisition unit 57 divides the time difference $\Delta T1$ acquired in step S104, for example, by the average of the times taken $\Delta t1R$, $\Delta t1L$, and thus calculates the normalized time difference $\Delta T1$. The normalization corrects variations in the time difference due to the distance between the speaker unit 2 and the front unit 1.

When the normalized time difference $\Delta T1$ is acquired, the speaker position detection unit 51 carries out the processing of steps S106 to S108 to find a time difference $\Delta Tr$ for the right speaker 21b of the front unit 1. The processing of steps S106 to S108 is different from the processing of steps S103 to S105 in that the speaker 21 outputting a test sound is the right speaker 21b of the front unit 1.

The test sound output instruction unit 56 causes a test sound to be outputted from the right speaker 21b of the front unit 1 (step S106). The test sound detection result acquisition unit 57 receives the information about the test sound from the detection response unit 71 and thus acquires the time difference $\Delta Tr$ between the times t1L, t1R when the microphones 22a, 22b included in the speaker unit 2 receive the test sound (step S107). The test sound detection result acquisition unit 57 also normalizes the time difference $\Delta Tr$, based on the times taken $\Delta t1L$, $\Delta t1R$ for the test sound to reach the microphones 22 from the speaker 21 (step S108).

Next, the position calculation unit 58 of the speaker position detection unit 51 specifies the position of the speaker unit 2, based on the normalized time differences $\Delta T1$, $\Delta Tr$ (step S109).

Generally, the speaker unit 2 arranged behind the listener or the like often faces in a direction (upward in FIG. 8) opposite to the direction in which the front unit 1 faces, due to its relation with the wall of the room. In FIG. 8, the distances between the left speaker 21a and the microphones 22a, 22b of the speaker unit 2a are defined as D1, D2, respectively, and the distances between the left speaker 21a and the microphones 22a, 22b of the speaker unit 2b are defined as D3, D4, respectively. In this case, (D1–D2)>(D3–D4) holds. (D1–D2) and (D3–D4) become greater as the speaker unit 2 is situated more to the left. On the assumption that the speed of sound is constant, the same characteristic applies to the normalized time difference ΔT1 or ΔTr.

The position calculation unit 58 specifies the position of the speaker unit 2, using the foregoing characteristic. If the time differences ΔT1, ΔTr are (t1L–t1R), the position calculation unit 58 sorts out the speaker units 2, based on the time difference ΔT1 found for each of the speaker units 2, and acquires a first list that places the speaker units 2 in an order. The position calculation unit 58 also sorts out the speaker units 2, based on the time difference ΔTr found for each of the speaker units 2, and acquires a second list that places the speaker units 2 in an order. If the first list and the second list place the speaker units 2 in the same order, it is determined that the speaker unit 2 with a greater time difference ΔT1 is situated more to the left. When finding the positions of two speaker units 2, the position calculation unit 58 determines that the speaker unit 2 with a greater time difference ΔT1 is situated to the left while the speaker unit 2 with a smaller time difference ΔT1 is situated to the right. Meanwhile, if the first list and the second list place the speaker units 2 in different orders, the position calculation unit 58 averages the values ΔT1 and ΔTr for each speaker unit 2 and determines that the speaker unit 2 with which this average is greater is situated more to the left. The position calculation unit 58 may also calculate how far each speaker unit 2 is away from the center, based on the time differences ΔTr, ΔT1 or the average of these. The position calculation unit 58 may specify whether the position of the speaker unit 2 is to the left or to the right, simply based on whether the time differences ΔTr, ΔT1 or the average of these is positive or negative.

The processing of steps S101 to S109 may be carried out with respect to the microphone 22c and the microphone 22a or 22b, instead of the microphones 22a, 22b, to detect the position in the direction of height of the speaker unit 2. In this case, the speaker position detection unit 51 may specify the position in a vertical direction, simply based on the time difference found for one speaker 21 of the front unit 1.

After the positions of the speaker units 2 are specified, the processing of step S110 is executed. In step S110, the audio parameter setting unit 52 allocates an audio channel to each of the speaker units 2, based on the specified positions of the speaker units 2. The audio signal output unit 53 outputs an audio signal corresponding to the allocated audio channel or the like, to each speaker unit 2. The audio parameter setting unit 52 may decide a parameter such as the amount of delay in and frequency characteristics of the audio signal outputted to each speaker unit 2, as well as the channel.

The above processing reduces the time and effort for the user to set a parameter such as the channel of an audio signal outputted from the speaker units 2. Particularly, the user neither has to install a microphone at a listening position nor has to manually associate the speaker units 2 with channels.

Figure 11:
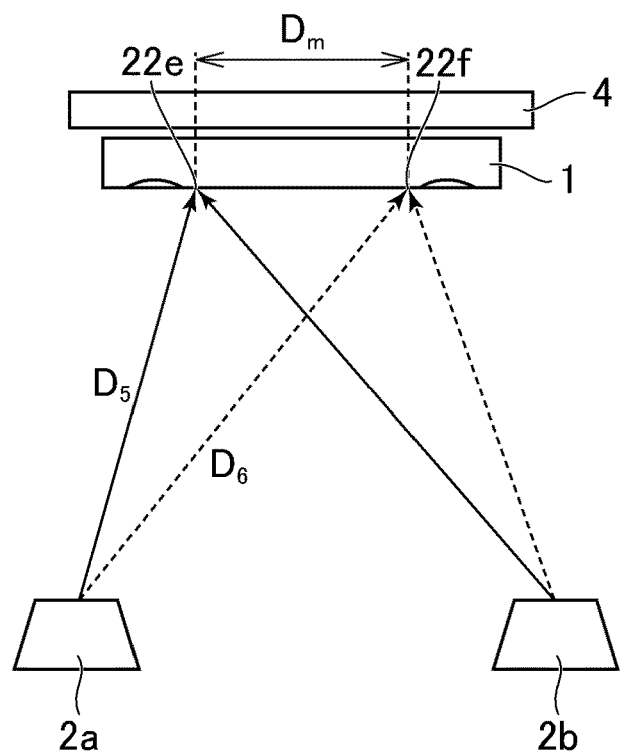
FIG. 11 explains another example of the relation between the speaker unit and the front unit.
Figure 12:
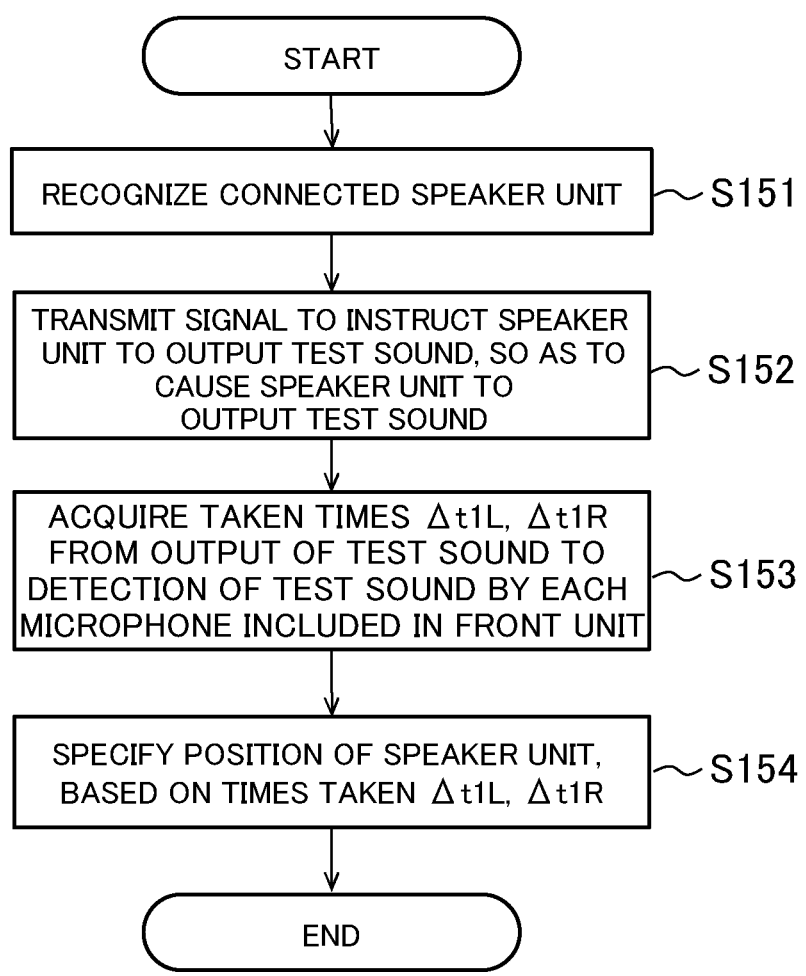
FIG. 12 is a flowchart showing another example of the processing by a speaker position detection unit.

A different technique from the above technique may be employed to detect the positions of the speaker units 2. FIG. 11 explains another example of the relation between the speaker unit 2 and the front unit 1. FIG. 12 is a flowchart showing another example of the processing by the speaker position detection unit 51. In the example of FIGS. 11 and 12, the microphone 22 included in the front unit 1 detects a test sound outputted from the speaker 21 included in each of the speaker units 2a, 2b, thus detecting the position of the speaker unit 2. FIG. 12 shows processing carried out instead of the processing of steps S101 to S109 of FIG. 7.

The example of FIGS. 11 and 12 is different from the example of FIGS. 7 and 8 in the following features. First, the speaker 21 of the speaker unit 2 outputs a test sound, and a plurality of microphones 22 of the front unit 1 receives the test sound. The timing of detecting a test sound tends not to vary due to the direction of the speaker unit 2. Therefore, the speaker position detection unit 51 calculates position information of the speaker unit 2, based on one speaker 21.

More specifically, the speaker position detection unit 51 of the front unit 1 carries out the following processing. First, the speaker position detection unit 51 recognizes the speaker unit 2 available for communication (step S151). The test sound output instruction unit 56 transmits a signal to instruct the speaker unit 2 to output a test sound and thus causes the speaker 21 included in the speaker unit 2 to output a test sound (step S152). The test sound detection result acquisition unit 57 acquires the times taken Δt1L, Δt1R from the output of the test sound to the detection of the test sound by the microphones 22e, 22f of the front unit 1 (step S153). The position calculation unit 58 then calculates position information representing the position of the speaker unit 2, based on the times taken Δt1L, Δt1R.

As understood from FIG. 11, the distance Dm between the microphone 22e and the microphone 22f is known in advance. Therefore, based on the distances D5, D6 found by multiplying the times taken Δt1L, Δt1R by the speed of sound, a triangle having the speaker 21 of the speaker unit 2 and the microphones 22e, 22f of the front unit 1 at the vertices is univocally defined. For example, the position calculation unit 58 finds an angle θ1 of the speaker unit 2a to the microphone 22e as a reference point and an angle θ2 of the speaker unit 2a to the microphone 22f as a reference point, based on the law of cosines and the distances Dm, D5, D6. The direction of the speaker unit 2a with respect to the front unit 1 as a reference point is thus found. Also, the position calculation unit 58 may calculate a trigonometric function using the angle θ1 and the distance D5, or the angle θ2 and the distance D6, to find the coordinates of the speaker unit 2a. This computation is also carried out with respect to the information acquired for the other speaker unit 2.

In the example of FIG. 12, the test sound detection result acquisition unit 57 may acquire the difference ΔT between the time t2L when the microphone 22e receives the test sound and the time t2R when the microphone 22f receives the test sound. In this case, the position calculation unit 58 calculates the direction with respect to the direction in which the microphones 22 of the front unit 1 are arrayed, based on the sign and magnitude of the difference ΔT.

Instead of calculating the direction using the lengths of the three sides of a triangle, a known microphone array technique may be used. A microphone array includes multiple microphones 22. The direction from which a test sound comes is calculated by a known computation technique. The speaker position detection unit 51 carries out this computation and thus calculates the direction of the test sound.

Second Embodiment

In a second embodiment, unlike the first embodiment, relative position information between the front unit 1 and the speaker unit 2 is calculated using a plurality of speakers 21 arranged in the front unit 1 and one microphone 22 arranged in the speaker unit 2. Hereinafter, the difference from the first embodiment will be described. The speaker unit 2 may have only one microphone. The other parts of the hardware configuration and functional configuration of the surround system according to the second embodiment will not be described further in detail.

Figure 13:
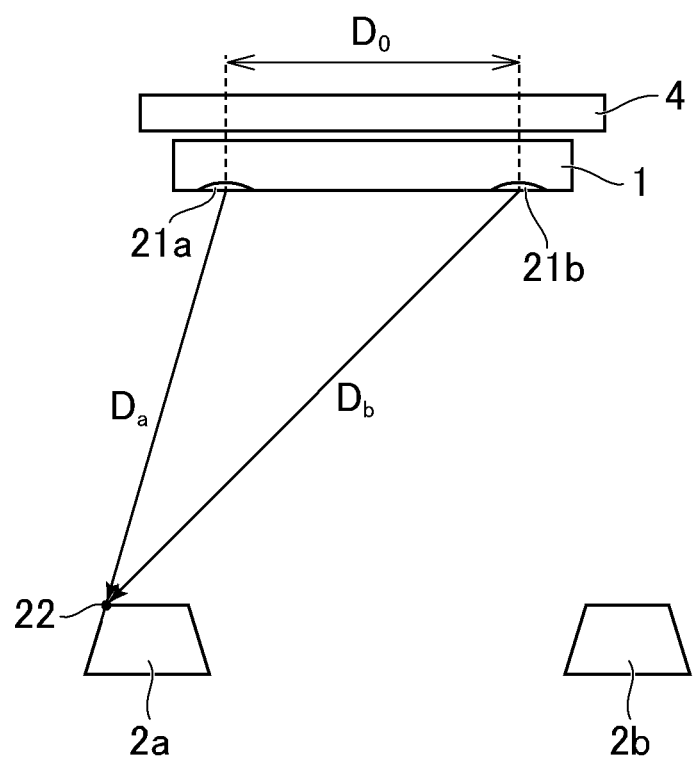
FIG. 13 explains an example of the relation between a speaker unit and a front unit according to a second embodiment.

FIG. 13 explains an example of the relation between the speaker unit 2 and the front unit 1 according to the second embodiment. In the example of FIG. 13, at least one microphone 22 included in the speaker unit 2 detects a test sound outputted from each of the speakers 21 included in the front unit 1. The position of the speaker unit 2 is thus detected. The output side and input side of the test sound are the reverse of those in the configuration shown in FIG. 11.

Figure 14:
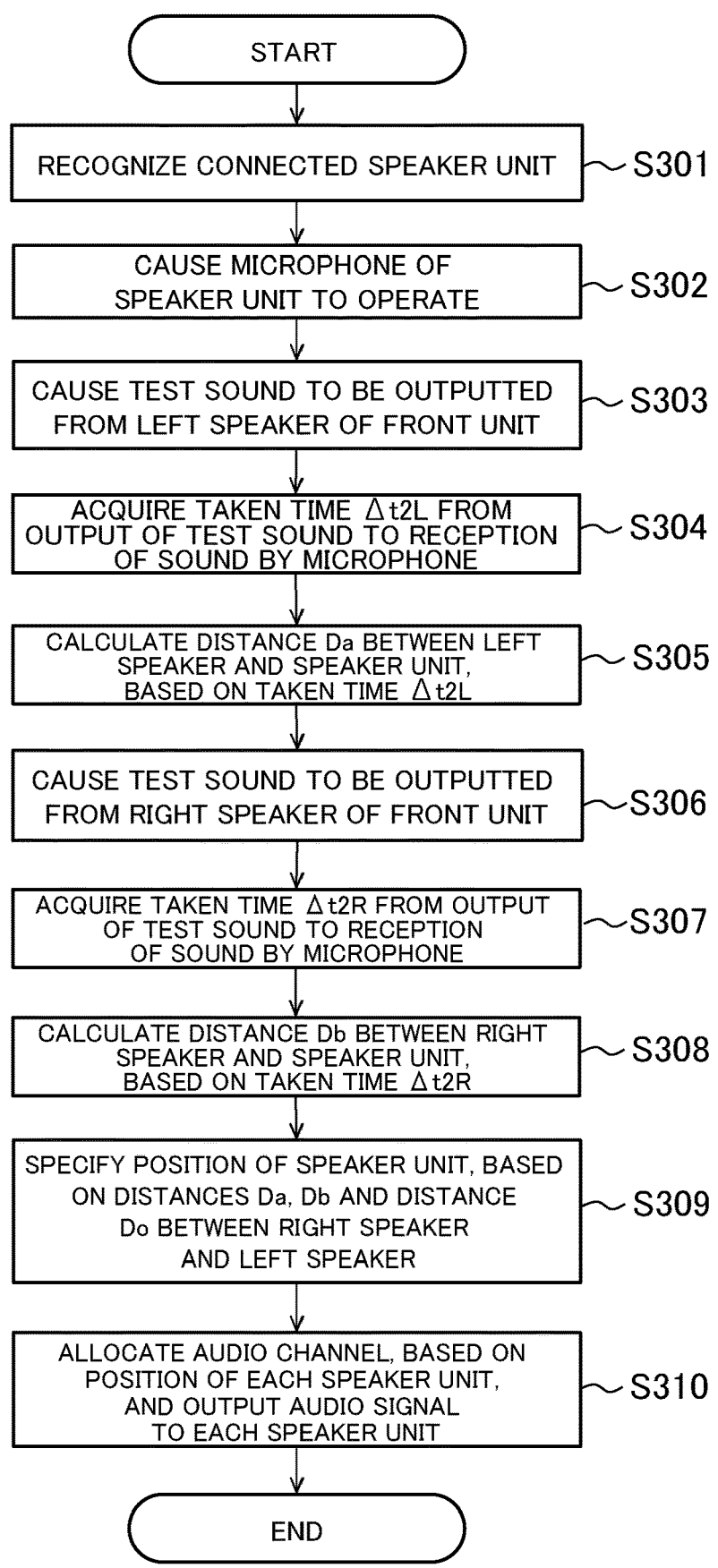
FIG. 14 is a flowchart showing an example of the processing by the front unit according to the second embodiment.

FIG. 14 is a flowchart showing an example of the processing by the front unit 1 according to the second embodiment. FIG. 14 corresponds to FIG. 7 of the first embodiment. A part or the entirety of the processing shown in FIG. 14 may be executed by another apparatus such as a smartphone. The processing of steps S302 to S309 is carried out for each speaker unit 2. It is assumed that the times of the front unit 1 and the speaker unit 2 are synchronized by a known technique.

First, the speaker position detection unit 51 recognizes the speaker unit 2 connected via the communication unit 13 (step S301). The speaker position detection unit 51 may recognize the speaker unit 2 connected via a cable.

Next, the test sound output instruction unit 56 instructs the speaker unit 2 to cause the microphone 22 of the speaker unit 2 to operate (step S302). More specifically, the test sound output instruction unit 56 transmits, to each speaker unit 2, a notification to start outputting a test sound. The operation of each speaker unit 2 is similar to that in the first embodiment except for targeting a test sound to one microphone 22 and therefore will not be described further in detail.

After the microphone 22 starts operating, the test sound output instruction unit 56 causes a test sound to be outputted from the left speaker 21a of the front unit 1 (step S303). Then, the speaker unit 2 detects the test sound inputted to the microphone and transmits information about the test sound. The information about the test sound is, for example, the time t2L when the test sound is received, or audio data of the microphone 22.

The test sound detection result acquisition unit 57 of the speaker position detection unit 51 receives the information about the test sound and thus acquires the taken time Δt2L from the output of the test sound to the reception of the test sound by the microphone 22 (step S304). More specifically, the test sound detection result acquisition unit 57 may subtract the time t0L when the left speaker 21a of the front unit 1 outputs the test sound from the time t2L when the test sound is received, thus calculating the taken time Δt2L.

Figure 15:
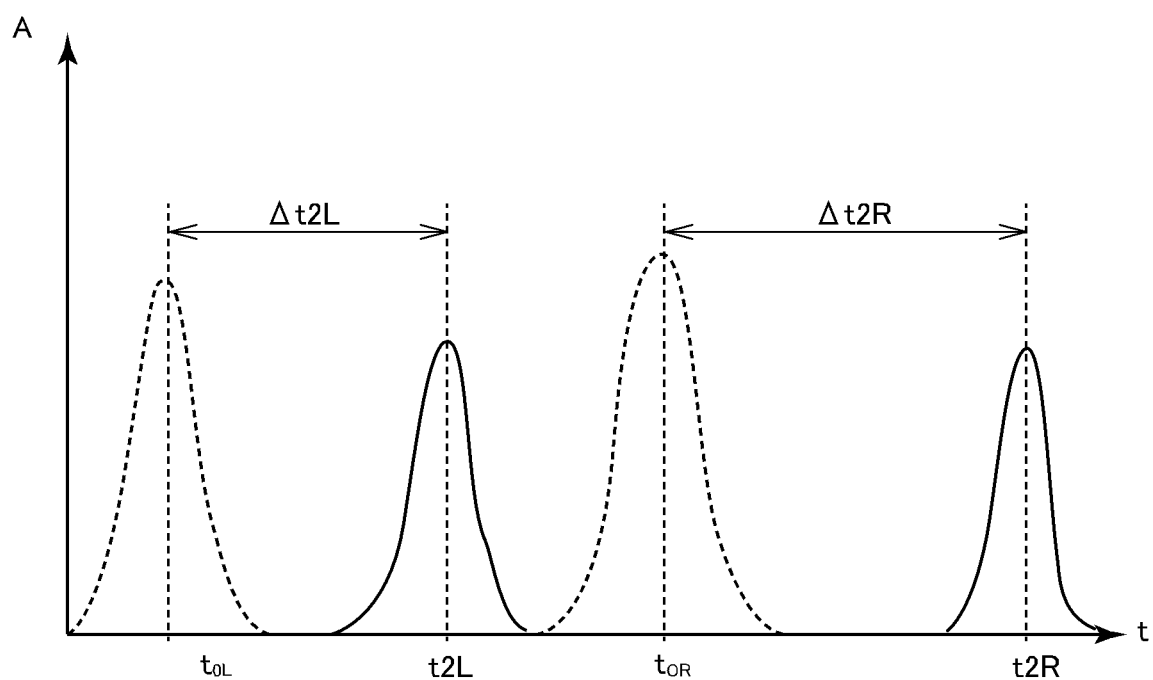
FIG. 15 explains the time of outputting a test sound from a speaker and the time of detecting the test sound by a microphone.

FIG. 15 explains the times t0L, t0R of outputting a test sound from the speakers 21 and the times t2L, t2R of detecting the test sound by the microphone 22. In FIG. 15, the left speaker 21a of the front unit 1 outputs a test sound at the time t0L and the microphone 22 of the speaker unit 2 detects the test sound at the time t2L. Also, the right speaker 21b outputs a test sound at the time t0R and the microphone 22 of the speaker unit 2 detects the test sound at the time t2R. The taken time Δt2R may be (t2R−t0R).

The test sound detection result acquisition unit 57 calculates the distance Da between the left speaker 21a and the speakers 21, based on the taken time Δt2L (step S305). The test sound detection result acquisition unit 57 multiplies the times taken Δt2L by the speed of sound and thus calculates the distance Da.

After the distance Da is calculated, the speaker position detection unit 51 carries out the processing of steps S306 to S308 to find the distance Db for the right speaker 21b of the front unit 1. The processing of steps S306 to S308 is different from the processing of steps S303 to S305 in that the speaker 21 outputting a test sound is the right speaker 21b of the front unit 1.

The test sound output instruction unit 56 causes a test sound to be outputted from the right speaker 21b of the front unit 1 (step S306). The test sound detection result acquisition unit 57 receives the information about the test sound from the detection response unit 71 and thus acquires the taken time Δt2R from the output of the test sound to the time t2R when the microphone 22 receives the test sound (step S307). The test sound detection result acquisition unit 57 calculates the distance Db between the right speaker 21b and the speaker unit 2, based on the taken time Δt2R (step S308).

Next, the position calculation unit 58 of the speaker position detection unit 51 specifies the position of the speaker unit 2, based on the distances Da, Db thus calculated and the distance Do between the right speaker 21b and the left speaker 21a (step S309).

As understood from FIG. 15, based on the distances Da, Db, Do, a triangle having the two speakers 21 of the front unit 1 and the one speaker unit 2a at the vertices is univocally defined. For example, the position calculation unit 58 finds angles θ3, θ4 of the speaker unit 2a to the left speaker 21a and the right speaker 21b as reference points, based on the law of cosines and the distances Da, Db, Do. The direction of the speaker unit 2a with respect to the front unit 1 as a reference point is thus found.

Also, the position calculation unit 58 may calculate a trigonometric function using the angle θ3 and the distance Da, or the angle θ4 and the distance Db, to find the coordinates of the speaker unit 2a. This computation is also carried out with respect to the information acquired for the other speaker unit 2.

Thus, with the combination of a plurality of speakers 21 and one microphone 22, the time and effort required of the user can be reduced.

As understood from the description of the embodiments, this specification discloses various technical ideas including the invention described below.

A speaker position detection system according to the invention includes: a first speaker unit having at least one speaker; a second speaker unit having a speaker and a plurality of microphones; and a detection unit which calculates relative position information between the first speaker unit and the second speaker unit. The detection unit causes the speaker included in the first speaker unit to output a test sound, and calculates the position information representing a position of one of the first speaker unit and the second speaker unit, based on the test sound detected by each of the plurality of microphones.

In an embodiment of the invention, the detection unit may calculate the position information representing the position of one of the first speaker unit and the second speaker unit, based on a difference between times when the respective microphones of the plurality of microphones detect the outputted sound.

In an embodiment of the invention, the detection unit may cause the speaker included in the first speaker unit to output a test sound, and may calculate the relative position information between the first speaker unit and the second speaker unit, based on the test sound detected by each of the plurality of microphones.

A speaker position detection method according to the invention includes: causing a speaker included in a first speaker unit having at least one speaker to output a test sound; and calculating position information representing a position of one of the first speaker unit and a second speaker unit, based on the test sound detected by each of a plurality of microphones included in the second speaker unit having a speaker.

A speaker position detection device according to the invention includes: a unit which causes a speaker included in a first speaker unit having at least one speaker to output a test sound; and a unit which calculates position information representing a position of one of the first speaker unit and a second speaker unit, based on the test sound detected by each of a plurality of microphones included in the second speaker unit having a speaker.

A program according to the invention causes a computer to function as: a unit which causes a speaker included in a first speaker unit having at least one speaker to output a test sound; and a unit which calculates position information representing a position of one of the first speaker unit and a second speaker unit, based on the test sound detected by each of a plurality of microphones included in the second speaker unit having a speaker. An information storage medium according to the invention is a computer-readable information storage medium in which the program is recorded.

Another speaker position detection system according to the invention includes: a first speaker unit having a plurality of speakers; a second speaker unit having a speaker and a microphone; and a detection unit which calculates position information representing a position of one of the first speaker unit and the second speaker unit. The detection unit causes at least two of the plurality of speakers included in the first speaker unit to output a test sound, and calculates the position information representing a position of one of the first speaker unit and the second speaker unit, based on the test sound outputted from each of the at least two speakers and detected by each of the microphones.

In an embodiment of the invention, the detection unit may cause at least two of the plurality of speakers included in the first speaker unit to output a test sound, and may calculate relative position information between the first speaker unit and the second speaker unit, based on the test sound outputted from each of the at least two speakers and detected by each of the microphones.

Another speaker position detection method according to the invention includes: causing at least two of a plurality of speakers included in a first speaker unit to output a test sound; and calculating position information representing a position of one of the first speaker unit and a second speaker unit, based on the test sound detected from each of the at least two speakers by a microphone included in the second speaker unit.

Another speaker position detection device according to the invention includes: a unit which causes at least two of a plurality of speakers included in a first speaker unit to output a test sound; and a unit which calculates position information representing a position of one of the first speaker unit and a second speaker unit, based on the test sound detected from each of the at least two speakers by a microphone included in the second speaker unit.

Another program according to the invention causes a computer to function as: a unit which causes at least two of a plurality of speakers included in a first speaker unit to output a test sound; and a unit which calculates position information representing a position of one of the first speaker unit and a second speaker unit, based on the test sound detected from each of the at least two speakers by a microphone included in the second speaker unit. Another information storage medium according to the invention is a computer-readable information storage medium in which the program is recorded.

In an embodiment of the invention, the speaker position detection system may further include a parameter decision unit which decides a parameter of an audio signal outputted to at least one of the first speaker unit and the second speaker unit, based on the calculated position information.

In an embodiment of the invention, the parameter decision unit may decide a channel of an audio signal allocated to at least one of the first speaker unit and the second speaker unit, based on the calculated position information.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A speaker position detection system comprising:
a first speaker unit having at least one speaker;
a second speaker unit having a speaker and a plurality of microphones;
at least one processor; and
at least one memory device that stores a plurality of instructions, which when executed by the at least one processor, causes the at least one processor:
cause the speaker included in the first speaker unit to output a test sound,
calculate relative position information representing a position of one of the first speaker unit and the second speaker unit based on the test sound detected by each of the plurality of microphones of the second speaker unit,
normalize a difference between times by dividing the difference by an average of a taken time for a first or second microphone of the plurality of microphones when the respective microphones of the plurality of microphones of the second speaker unit detect the test sound, and
calculate the position information representing the position of one of the first speaker unit and the second speaker unit, based on the normalized difference.

2. The speaker position detection system according to claim 1, wherein
the at least one processor decides a parameter of an audio signal outputted to at least one of the first speaker unit and the second speaker unit, based on the calculated position information.

3. The speaker position detection system according to claim 2, wherein
the at least one processor decides a channel of an audio signal allocated to at least one of the first speaker unit and the second speaker unit, based on the calculated position information.

4. The speaker detection system according to claim 1, wherein
the taken time is the difference between a first time that the first speaker unit outputs the test sound and a second time that the respective first or second microphone of the plurality of microphones detects the test sound.

5. The speaker detection system according to claim 1, further comprising:

a second speaker of the first speaker unit, wherein
the at least one processor causes the second speaker included in the first speaker unit to output a second test sound;
the at least one processor normalizes a second difference between times when the respective microphones of the plurality of microphones of the second speaker unit detect the second test sound; and
the at least one processor calculates the position information representing the position of one of the first speaker unit and the second speaker unit based on both normalized difference and the second normalized difference.

6. The speaker position detection system according to claim 5, wherein
the at least one processor normalizes by dividing the difference by the average of a taken time for a first or second microphone of the plurality of microphones.

7. The speaker detection system according to claim 6, wherein
the taken time is the difference between a first time that the first speaker unit outputs the test sound and a second time that the respective first or second microphone of the plurality of microphones detects the test sound.

8. The speaker position detection system according to claim 1, further comprising:
a third speaker unit having a speaker and a plurality of microphones, wherein the memory device further comprises instructions, when executed by the at least one processor, to cause the processor to operate to:
determine a difference between times when the respective microphones of the plurality of microphones of the third speaker unit detect the test sound; and
determine a relative position between the second speaker unit and the third speaker unit based on comparing:
a first difference, which is the difference between when the respective microphones of the plurality of microphones of the second speaker unit detect the test sound, and
a second difference, which is the difference between when the respective microphones of the plurality of microphones of the third speaker unit detect the test sound.

9. The speaker position detection system according to claim 8, wherein the comparing determines which of the first and second differences is greater.

10. The speaker position detection system according to claim 9, wherein
the first speaker unit comprises a second speaker; and
the memory device further comprises instructions, when executed by the at least one processor, to cause the processor to operate to:
cause the second speaker included in the first speaker unit to output a second test sound;
determine a third difference between times when the respective microphones of the plurality of microphones of the second speaker unit detect the second test sound;
determine a fourth difference between times when the respective microphones of the plurality of microphones of the third speaker unit detect the second test sound; and
determine an alternate relative position between the second speaker unit and the third speaker unit by comparing the third difference with the fourth difference.

11. The speaker position detection system according to claim 10, wherein
the memory device further comprises instructions, when executed by the at least one processor, to cause the processor to operate to:
determine that the alternate relative position is different from the relative position, and in response:
determine a first average of the first and third differences for the second speaker unit;
determine a second average of the second and fourth differences for the third speaker unit;
compare the first and second averages to determine which is greater; and
determine a final relative position between the second speaker unit and the third speaker unit based on the comparing.

12. A speaker position detection method comprising:
causing, with at least one processor operating with a memory device in a device, a speaker included in a first speaker unit having at least one speaker to output a test sound; and
calculating, with the at least one processor operating with the memory device in the device, position information representing a position of one of the first speaker unit and a second speaker unit, based on the test sound detected by each of a plurality of microphones included in the second speaker unit having a speaker, wherein
the at least one processor normalizes a difference between times by dividing the difference by an average of a taken time for a first or second microphone of the plurality of microphones when the respective microphones of the plurality of microphones of the second speaker unit detect the test sound, and
the calculating of the position information includes calculating the position information representing the position of one of the first speaker unit and the second speaker unit, based on the normalized difference.

13. The speaker position detection method according to claim 12, further comprising
deciding, with the at least one processor operating with the memory device in the device, a parameter of an audio signal outputted to at least one of the first speaker unit and the second speaker unit, based on the calculated position information.

14. The speaker position detection method according to claim 13, wherein the deciding the parameter includes deciding a channel of an audio signal allocated to at least one of the first speaker unit and the second speaker unit, based on the calculated position information.

15. A speaker position detection device comprising:
at least one processor; and
at least one memory device that stores a plurality of instructions, which when executed by the at least one processor, causes the at least one processor to operate to:
cause a speaker included in a first speaker unit having at least one speaker to output a test sound; and
calculate position information representing a position of one of the first speaker unit and a second speaker unit, based on the test sound detected by each of a plurality of microphones included in the second speaker unit having a speaker, wherein
the at least one processor normalizes a difference between times by dividing the difference by an average of a taken time for a first or second microphone of the plurality of microphones when the respective microphones of the plurality of microphones of the second speaker unit detect the test sound, and the calculating of the position information is based on the normalized difference.

16. The speaker position detection device according to claim 15, wherein the at least one processor decides a parameter of an audio signal outputted to at least one of the first speaker unit and the second speaker unit, based on the calculated position information.

17. The speaker position detection device according to claim 16, wherein the at least one processor decides a channel of an audio signal allocated to at least one of the first speaker unit and the second speaker unit, based on the calculated position information.

* * * * *